United States Patent [19]

Kaminski et al.

[11] Patent Number: 4,547,886
[45] Date of Patent: Oct. 15, 1985

[54] CATALYZED SEALED-OFF $CO_2$ LASER

[75] Inventors: Walter R. Kaminski, North Palm Beach; Stanley J. Scalise, Palm Springs, both of Fla.

[73] Assignee: United Technologies Corporation, Hartford, Conn.

[21] Appl. No.: 507,902

[22] Filed: Jun. 27, 1983

Related U.S. Application Data

[63] Continuation-in-part of Ser. No. 306,117, Sep. 25, 1981, abandoned.

[51] Int. Cl.$^4$ .............................................. H01S 3/22
[52] U.S. Cl. .................................... 372/59; 313/558; 372/87
[58] Field of Search ...................... 372/59, 87, 88, 33, 372/60; 313/553, 558, 561, 566

[56] References Cited

U.S. PATENT DOCUMENTS 2,295,694  9/1942  Slack et al. ........................... 313/558
4,159,856  5/1979  Chilcot .................................... 372/87

FOREIGN PATENT DOCUMENTS 0250928  1/1927  United Kingdom ................ 313/566
2028571  3/1980  United Kingdom .................. 372/59

OTHER PUBLICATIONS

R. I. Rudko, J. W. Barnie, "Long Life Operation of $CO_2$ Mini-Tea Lasers", SPIE, vol. 227, $CO_2$ Laser Devices and Applications, 1980, pp. 45–47.
L. J. Denes, "Ultraviolet Initiated $CO_2$ Laser Research, Phase II", Report No. AFWL-TR-76-136, Jan. 1977, pp. 16–36.

*Primary Examiner*—James W. Davie
*Attorney, Agent, or Firm*—Eric W. Petraske

[57] ABSTRACT

A sealed-off $CO_2$ laser employs a catalyst to promote the recombination of CO and oxygen. The catalyst is loosely contained within a catalyst holder having a plurality of apertures and the catalyst is brought into contact with the gas by means of the pressure pulse caused by the electric discharge.

2 Claims, 4 Drawing Figures

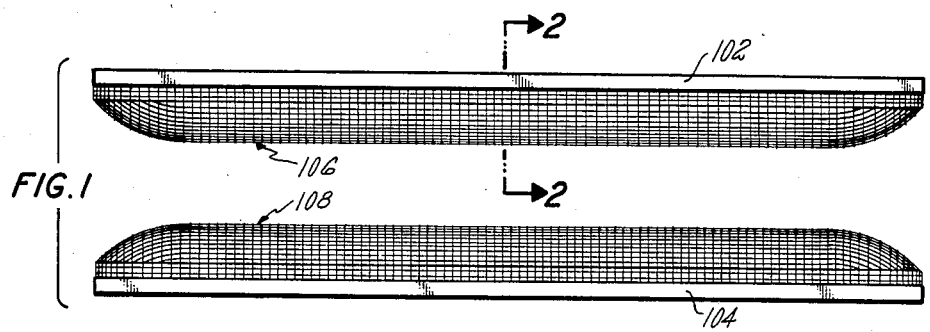
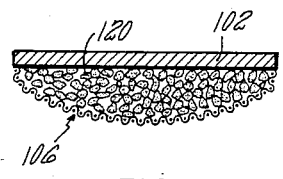

FIG. 3
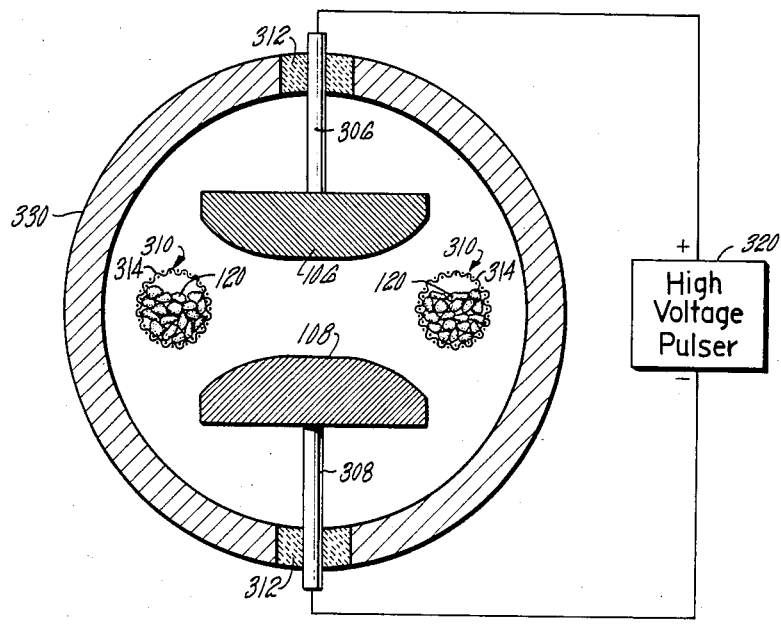
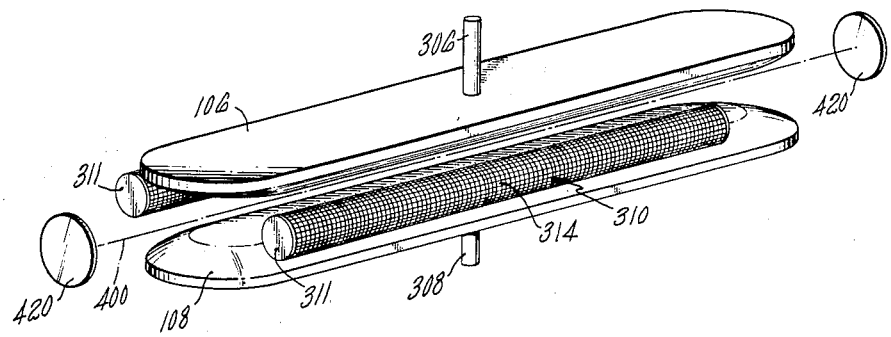
FIG. 4

4,547,886

CATALYZED SEALED-OFF CO₂ LASER

CROSS REFERENCE TO RELATED APPLICATIONS

This is a continuation-in-part of application Ser. No. 306,117, filed 9/25/81, now abandoned.

TECHNICAL FIELD

The technical field of the invention is that of a sealed-off $CO_2$ laser.

BACKGROUND ART

It has long been known in the $CO_2$ laser art that an electrically excited $CO_2$ gain medium will partially decompose into CO and oxygen, and that products of this decontamination tend to suppress lasing action. Oxygen in quantities as small as 1% leads to arcing between the laser electrodes and subsequent loss in optical power. One prior art approach to this problem has been to use a heated platinum wire to encourage the recombination of CO and oxygen to form $CO_2$. This method has the obvious drawbacks of requiring an additional power supply to heat the platinum wire and also of increasing the heat within the laser discharge volume.

Several experiments have been made to test the use of an ambient temperature catalyst, the materials including activated copper, activated platinum and hopcalite, a commercial mixture of magnesium oxide, copper oxide and trace quantities of other oxides. This material is available commercially from the Mine Safety Appliances Company. An article by C. Willis and J. G. Purdon in the Journal of Applied Physics, Vol. 50, No. 4 in April 1979 discloses the use of hopcalite in an external gas loop joined to the active laser volume, but in which the catalyst is not present within the laser volume. An article by R. I. Rudko and J. W. Barnie in the Proceedings of the SPIE, Vol. 227, entitled $CO_2$ Laser Devices and Applications, published in 1980, reports the successful application of a solid ambient temperature catalyst within a laser cavity, but does not give any detail as to the type of catalyst and arrangement of the catalyst in the cavity. Such details were said in that article to be proprietary.

DISCLOSURE OF INVENTION

The invention relates to a sealed-off $CO_2$ laser, in which the $CO_2$ gas is maintained in purity by a solid, ambient temperature catalyst contained within a porous electrode.

BRIEF DESCRIPTION OF DRAWINGS

FIG. 1 shows an embodiment of the invention employing catalyst in the form of solid pellets; and FIG. 2 shows a cross section of an electrode in FIG. 1.

FIG. 3 shows a cross section of an alternate embodiment of the invention.

FIG. 4 shows in perspective the alternate embodiment of FIG. 3.

BEST MODE FOR CARRYING OUT THE INVENTION

FIG. 1 illustrates schematically a sealed-off laser constructed according to the invention. Cover plates 102 and 104 form two sides of the laser cavity. Electrodes 106 and 108 are shaped according to conventional means to form electrodes for passage of an electric discharge through $CO_2$ gas. The electrodes are formed according to a known configuration, illustrated in copending application Ser. No. 256,282 assigned to the assignee hereof, filed Apr. 23, 1981, now abandoned, incorporated herein by reference, which discloses a sealed-off $CO_2$ laser without a catalyst.

In operation, a pulsed electric discharge is generated between electrodes 106 and 108 thereby exciting the $CO_2$ gain medium and initiating laser action. The electrical discharge heats up the $CO_2$ gas within a confined space and thus increases the pressure. A pressure pulse forms within the central discharge region and spreads rapidly outwards to equalize the pressure within the confined volume. This pressure pulse passes through the porous electrodes 106 and 108 forcing a portion of the $CO_2$ gain medium through holes in the electrodes and from the laser cavity region into the interior of electrodes. This gas motion serves to circulate the gas thus bringing dissociated $CO_2$, i.e. CO and O, into the interior of the electrodes. In the electrode interior, the gas comes in contact with a catalyst which is illustrated as being in the form of solid pellets, 120, through a catalyst may also be coated on a substrate if that is found to be convenient.

A second mechanism of bringing dissociated gas into contact with the catalyst is diffusion, which will take place even when the laser is not in operation. Because the dissociation products of $O_2$ and CO will initially be concentrated between the electrodes, they will tend to diffuse outward from their original location, i.e. will diffuse into the interior of electrodes 106 and 108, thus coming into contact with the catalyst.

The catalyst may be any well known catalyst, such as platinum, activated copper or hopcalite, which tends to promote the recombination of CO and O into $CO_2$.

In the illustration, the sidewalls, mirrors, electrical discharge connections and other components of the laser have been omitted for the sake of simplicity and clarity in presentation.

The electrodes illustrated in the drawing are formed from wire mesh having openings in the form of rectangular holes, but the size and shape of the openings are not critical to the invention. Any convenient form of aperture, such as circular holes, hexagons or rectangular holes may be used. The holes need not be distributed uniformly over the electrode surface and may be formed by any convenient means, mechanical or chemical. The size of the holes will be related to the size of the catalyst pellets, of course, since it is desirable to keep catalyst particles out of the laser discharge region. The exact hole and catalyst size will depend on the particular application used, and particularly upon the amount of energy in the laser discharge and thus the amount of pressure pulse generated. If the catalyst particles are light enough so that they are set in motion during the pressure pulse, an advantageous further benefit of the invention is that the catalyst surface will be constantly turned over, thus exposing the catalyst surface evenly.

Although the invention was made in connection with a sealed-off laser, it may also be used in connection with a recirculating gas laser. For example, a fan could be used to circulate gas through electrode 106, around an external loop and back through electrode 108, thus exposing the gas efficiently to the catalyst and retaining one of the chief advantages of the invention, namely the compact active volume of the laser that is made possible by use of the catalyst-containing electrodes.

The practicality of mesh electrodes (without catalyst) has previously been demonstrated in a report by L. J. Denes entitled "Ultraviolet Initiated $CO_2$ Laser Research, Phase II", Report No. AFWL-TR-76-136, January 1977.

This embodiment employs a TEA laser, as described in copending application Ser. No. 256,282, now abandoned, but the type of excitation, type of ionization and pressure of the laser are not relevant to this invention, which relates to the use of ambient temperature catalysts within a porous container.

FIG. 3 illustrates in cross section an alternate embodiment of the invention, in which high voltage pulser 320 supplies pulsed high voltage to electrodes 106 and 108 through insulators 312 and conducting rods 306 and 308 respectively set in the wall of tube 330, which forms the sealed-off enclosure. This embodiment has the advantage that a metal tube is much simpler and cheaper to construct than the machinable ceramic of the previous embodiment. Electrodes 106 and 108 are formed from solid blocks of metal having the same profile as the porous electrodes of the previous embodiment. The catalyst is now contained in porous cylinders 310, spaced on both sides of the discharge region. The catalyst is indicated by the numeral 120 and, as can be seen in the drawing, does not entirely fill the interior of container 310. This arrangement leaves room for the catalyst to move in response to vibration of the laser, (which will vibrate when it is contained in a moving vehicle), or in response to a pressure pulse caused by the heating of the $CO_2$ gas during the discharge.

FIG. 4 illustrates in perspective the embodiment shown in cross section in FIG. 3. Axis 400 penetrates through the discharge region. Catalyst containers 310 have end caps 311 to close off the ends and have a surface 314 which is a wire screen to permit free circulation of the gas. A wire screen is not essential and any number of other surface materials having apertures may also be used. The essential point is that there be sufficient number and area of holes to communicate between the interior of catalyst holder 310 and the remainder of lasing gas medium. Mirrors 420, which define the optical cavity of the laser, are shown on axis 400.

The end plates of the tube 330 are conventional, as are insulating supports to position electrodes 100 and 108 with respect to each other and with respect to tube 330. Similarly, catalyst holders 310 are supported by any of a number of conventional supports. The type and position of such support are not critical to the invention. These conventional components are omitted from the drawing in order to improve the clarity of exposition.

The invention has been described with respect to two embodiments, one having an electrode that also functions as a catalyst holder and the other having the catalyst contained in a separate container. Those skilled in the art will be able to construct many other embodiments, in the light of this disclosure. The essential point, however, is that the catalyst be disposed loosely within a container. The phase disposed loosely uses the dictionary definitions of the words, i.e., the catalyst is not fastened down but is free to move about within the container. This produces the advantageous feature that the catalyst is constantly turned as the laser is moved while being transported or as the pressure pulses within the gas shake the catalyst so that the surface of the catalyst is uniformly exposed.

We claim:

1. A pulsed $CO_2$ laser comprising
a lasing medium enclosed within a laser enclosure;
pulsed pumping means for exciting said lasing medium through an electric discharge in a discharge region in said lasing medium; and
means for resonating optical radiation in a portion of said discharge region in said lasing medium;
characterized in that said laser includes at least one catalyst holder disposed within said laser enclosure outside of said discharge region,
said catalyst holder having an interior portion containing a catalyst loosely disposed therein and a plurality of apertures providing a direct communicating path for said lasing medium between said interior portion of said catalyst holder and said discharge region; and
a predetermined quantity of particulate catalyst loosely disposed within said interior portion, whereby at least a portion of said particulate catalyst may move in response to said pulsed pumping means.

2. A $CO_2$ laser comprising:
first and second electrodes disposed in a discharge region containing a gain medium;
means for exciting said gain medium with an electric discharge, and
means for resonating laser radiation in said discharge region, characterized in that:
said laser includes at least one catalyst holder positioned outside said discharge area and having an interior portion containing a solid granular catalyst loosely disposed therein, said interior portion being in direct communication with said discharge region by means of a plurality of apertures passing between said interior portion and said discharge region.

* * * * *